United States Patent
Patalak et al.

(10) Patent No.: US 8,485,482 B2
(45) Date of Patent: Jul. 16, 2013

(54) RETAINING SYSTEM

(75) Inventors: John Peter Patalak, Concord, NC (US); Donald Eric Krueger, Stoney Point, NC (US); Henry Thomas Fowler, Charlotte, NC (US)

(73) Assignee: National Association for Stock Car Auto Racing, Inc., Daytona Beach, FL (US)

( * ) Notice: Subject to any disclaimer, the term of this patent is extended or adjusted under 35 U.S.C. 154(b) by 344 days.

(21) Appl. No.: 12/819,336

(22) Filed: Jun. 21, 2010

(65) Prior Publication Data
US 2011/0309219 A1    Dec. 22, 2011

(51) Int. Cl.
| A47B 96/06 | (2006.01) |
| A47B 91/00 | (2006.01) |
| A47B 81/00 | (2006.01) |
| E04G 3/00 | (2006.01) |
| F16B 1/00 | (2006.01) |
| G09F 7/18 | (2006.01) |

(52) U.S. Cl.
USPC ............ 248/229.11; 248/231.31; 248/346.03; 248/346.04; 248/220.21; 248/220.22; 248/349.1; 248/316.2; 312/223.2; 361/679.01; 361/679.02

(58) Field of Classification Search
USPC ............ 248/223.13, 229.11, 231.31, 346.03, 248/346.04, 220.21, 309.1, 349.1, 316.2, 248/27.3, 220.22; 312/223.2; 361/679.01, 361/679.02
See application file for complete search history.

(56) References Cited

U.S. PATENT DOCUMENTS

| 4,627,589 | A | * | 12/1986 | Hotsumi | 248/346.03 |
| 5,098,046 | A |   | 3/1992 | Webb |  |
| D443,499 | S |   | 6/2001 | Gretz |  |
| D463,250 | S |   | 9/2002 | Valentz |  |
| D471,431 | S |   | 3/2003 | Valiulis et al. |  |
| D480,948 | S |   | 10/2003 | Patrizzi et al. |  |
| D492,888 | S |   | 7/2004 | Wilson |  |
| 6,766,992 | B1 |   | 7/2004 | Parker |  |
| D524,635 | S |   | 7/2006 | Gretz |  |
| 7,273,203 | B2 | * | 9/2007 | Carnevali | 248/553 |
| 7,441,744 | B2 | * | 10/2008 | Chen et al. | 248/694 |
| D587,640 | S |   | 3/2009 | Fraser et al. |  |
| 7,902,457 | B2 |   | 3/2011 | Johnson |  |
| 8,070,125 | B2 | * | 12/2011 | Sun | 248/560 |
| 8,091,838 | B2 | * | 1/2012 | Sun | 248/27.1 |
| D654,350 | S |   | 2/2012 | Preda |  |
| D656,883 | S |   | 4/2012 | Patalak et al. |  |
| 2011/0103000 | A1 | * | 5/2011 | Sun | 361/679.33 |
| 2011/0121146 | A1 | * | 5/2011 | Sun | 248/201 |

* cited by examiner

*Primary Examiner* — Terrell McKinnon
*Assistant Examiner* — Christopher Garft
(74) *Attorney, Agent, or Firm* — Alston & Bird LLP

(57) ABSTRACT

A retaining system according to example embodiments of the present invention may include a base plate that includes a cam and alignment guides, where the cam defines both a locked position and an unlocked position, and a support shoe that includes alignment tabs and a locking tab, where the support shoe is configured to be inserted into the alignment guides when the cam member is in the unlocked position. Upon insertion of the support shoe into the alignment guides, the cam may be configured to engage the locking tab of the support shoe and bias at least one of the alignment tabs into engagement with at least one of the alignment guides as the cam advances from the unlocked position to the locked position.

20 Claims, 10 Drawing Sheets

SECTION A-A

RETAINING SYSTEM

TECHNOLOGICAL FIELD

The present invention relates to a system for securing a device to a bracket and, more particularly, to a retaining system configured for ease of insertion and removal and secure retention of a device within the system.

BACKGROUND

Fastening systems are commonly used to retain an object in a desired location. Fastening systems are often designed to preclude movement in all three dimensions or directions. When the environment in which the object is to be retained is subject to severe forces and impacts, fastening systems often include bolts, screws, welds, or other semi-permanent or permanent fastening methods configured to withstand such forces and impacts.

Interchangeability of objects is limited or encumbered by fastening methods noted above as the systems usually require multiple fasteners (e.g., a bolt in each of four corners) and the removal of each fastener often requires tools. Retaining an object in an obscure or hard-to-reach location may be precluded by the need to access the location with tools of sufficient size and strength to remove the fasteners to remove the object. Further, installing or retaining an object within a location may be difficult due to the lack of ability to see the fasteners or fastener recess in the object that is to be fastened. Interchangability of objects may be a slow and detailed task that requires a high degree of accuracy and time. It is desirable to have a retaining system that allows for simple and fast installation and removal of an object without requiring multiple fasteners, large tools, or line-of-sight access to the retaining system.

BRIEF SUMMARY

Various embodiments of the present invention are directed to retaining systems that may releasably secure a device to a base plate. The device may be secured to a support shoe configured to be secured within the base plate to hold the device in a fixed location relative to the base plate.

A retaining system according to example embodiments of the present invention may include a base plate that includes a cam and alignment guides, where the cam defines both a locked position and an unlocked position, and a support shoe that includes one or more alignment tabs and a locking surface, where the support shoe is configured to be inserted into the alignment guides when the cam member is in the unlocked position. Upon insertion of the support shoe into the alignment guides, the cam may be configured to engage the locking surface of the support shoe and bias at least one of the alignment tabs into engagement with at least one of the alignment guides as the cam advances from the unlocked position to the locked position. The cam may be biased toward the locked position. Further, the cam may be configured to be retained in the unlocked position by a pin when the pin is in a raised position and engaged with the cam. The pin may be biased in the raised position such that, in response to the cam being moved from the locked position to the unlocked position, the support shoe may be urged away from the base plate. The support shoe may be configured to disengage the pin from the cam in response to the support shoe being inserted into the alignment guides. Further, the cam may be configured to advance from the unlocked position to the locked position when the support shoe is inserted into the alignment guides. The support shoe may be configured to be attached to a data recording device. The base plate of the retaining system may be configured to be attached to a structural member of a vehicle. The location of the support shoe may be fixed relative to the base plate when at least one of the alignment tabs is engaged with at least a corresponding one of the alignment guides and the cam is in the locked position. The retaining system may further include a housing that is attached to the base plate and at least partially encloses the cam member.

Embodiments of the present invention may include a base plate of a retaining system that includes a plate, alignment guides, a cam rotatable between a locked position and an unlocked position, and a pin. The cam may be biased in the locked position. The pin may define an engaged position and a disengaged position. When the cam is in the unlocked position, the pin may engage the cam, thereby retaining the cam in the unlocked position. The pin may be biased in the engaged position. The cam may rotate to the locked position in response to the pin being moved to the disengaged position. The base plate may be configured for semi-permanent attachment to a structure. The cam may include a keyway configured to enable rotation of the cam from the locked position to the unlocked position when engaged by a key. The alignment guides may each include an engagement surface where at least two of the alignment guides include engagement surfaces arranged in intersecting planes relative to one another.

Embodiments of the present invention may include a support shoe of a retaining system that includes a body including a front surface and a back surface, and a first and a second alignment tab each including an alignment tab engagement surface. Each of the alignment tab engagement surfaces may be configured at an acute angle relative to the back surface. The support shoe may further include a locking element including a locking element engagement surface. The locking element engagement surface may be configured at an acute angle relative to the back surface. The front surface of the support shoe may be configured to receive a device, such as a data recording device.

BRIEF DESCRIPTION OF SEVERAL VIEWS OF THE DRAWING(S)

Reference will now be made to the accompanying drawings, which are not necessarily drawn to scale, and wherein.

DETAILED DESCRIPTION

Figure 1:
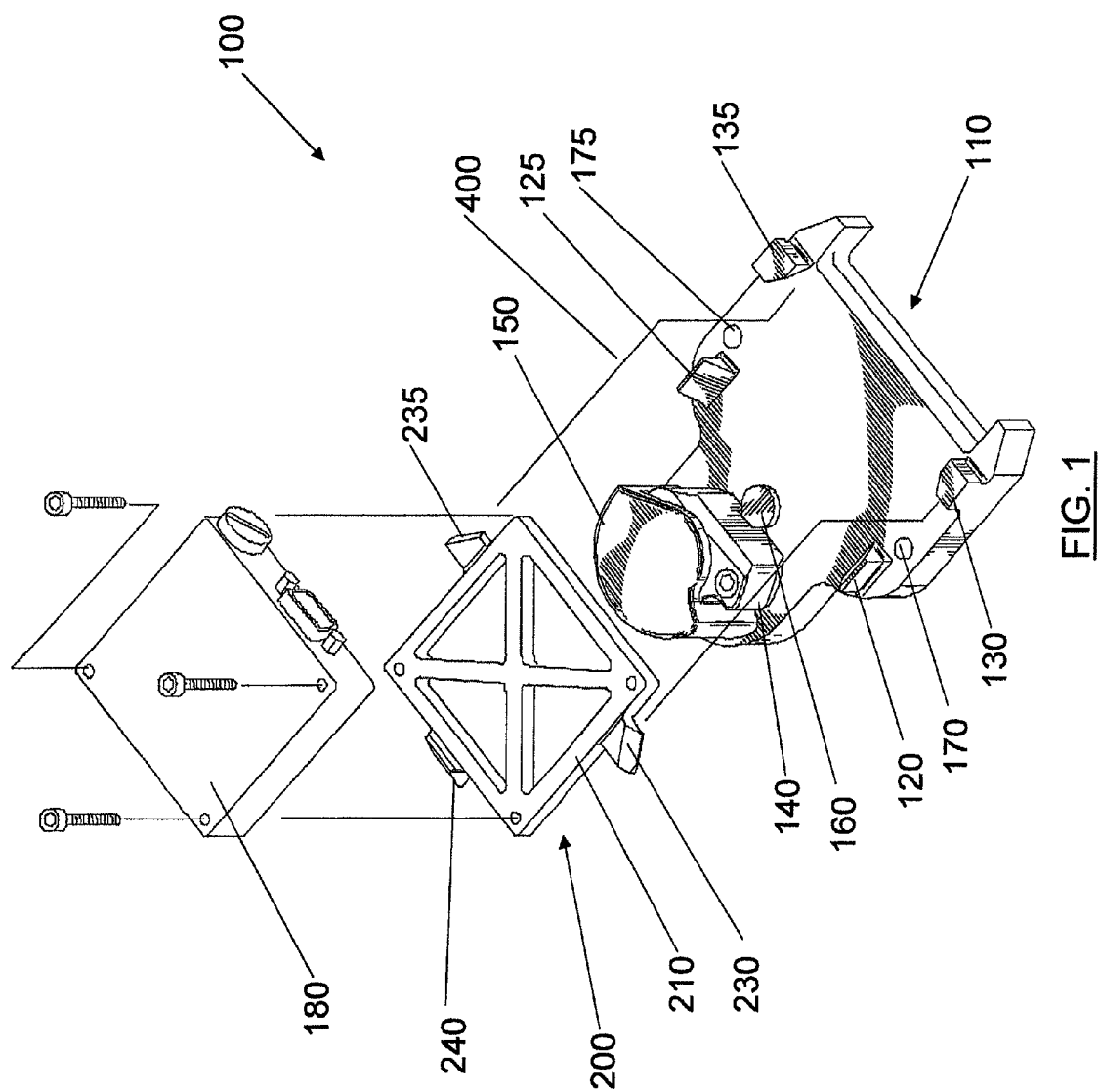
FIG. 1 is a retaining system according to an example embodiment of the present invention.

The present invention will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The terms top, bottom, side, up, down, upwards, downwards, vertical, horizontal, and the like as used below do not imply a required limitation in all embodiments of the present invention but rather are used herein to help describe relative direction or orientation in the example embodiments illustrated in the figures. The drawings omit illustration of certain energy absorbing materials, padding, fabric, and other coverings to facilitate ease of visibility and understanding of features of the invention.

Various embodiments of the present invention provide a retaining system configured to secure a support shoe to a releasable, locking base plate. The base plate of the retaining system may be configured for permanent or semi-permanent attachment to a structure, such as a structural member of a vehicle, while the support shoe is configured for releasable attachment to the base plate. Permanent attachment means may include welding or a permanent adhesive whereas semi-permanent attachment may include threaded fasteners or rivets among other fastening means. The base plate is configured with a securing means to securely retain the support shoe within the base plate and hold the support shoe in rigid contact with the base plate. The support shoe may be adapted to attach to a variety of devices such that a device attached to the support shoe may be releasably secured to the base plate.

Embodiments of the present invention may be configured for secure retention of a device to a fixed location, such as a data recorder configured to be securely attached to a structural member of a vehicle. As such, retaining systems according to embodiments of the present invention may be configured and used to securely retain a device in a fixed location during significant movement and acceleration of the retaining system itself, such as during a vehicle impact.

Embodiments of the present invention may also be configured for easy and/or fast installation and removal of a support shoe within the base plate relative to attachment methods that require one or more fasteners. The retaining system may be adapted to receive and secure the support shoe to the base plate without requiring tools. The retaining system may further be adapted for release of the support shoe through the movement of a single locking member, possibly using a key or tool. The locking member may include a handle or lever permanently attached or integrally connected to the locking member to allow tool-free removal of the support shoe from the base plate.

As illustrated in FIG. 1, the retaining system 100 includes a base plate 110 and a support shoe 200. The base plate is configured with alignment guides 120, 125, 130, 135, a cam 140, a housing 150, and a retaining pin 160. The base plate may further be configured with mounting holes 170, 175, which may be configured in a variety of ways as is apparent to one of ordinary skill in the art. The support shoe 200 is constructed of a body 210 including alignment tabs 230, 235 and a locking element, which may be a locking tab 240 as depicted. The support shoe 200 may be structured for secure attachment to the base plate 110. The support shoe 200 may be sized and shaped to be aligned by the alignment guides 120, 125, 130, 135 and secured in position by the cam 140 engaging the locking tab 240.

Figure 2A:
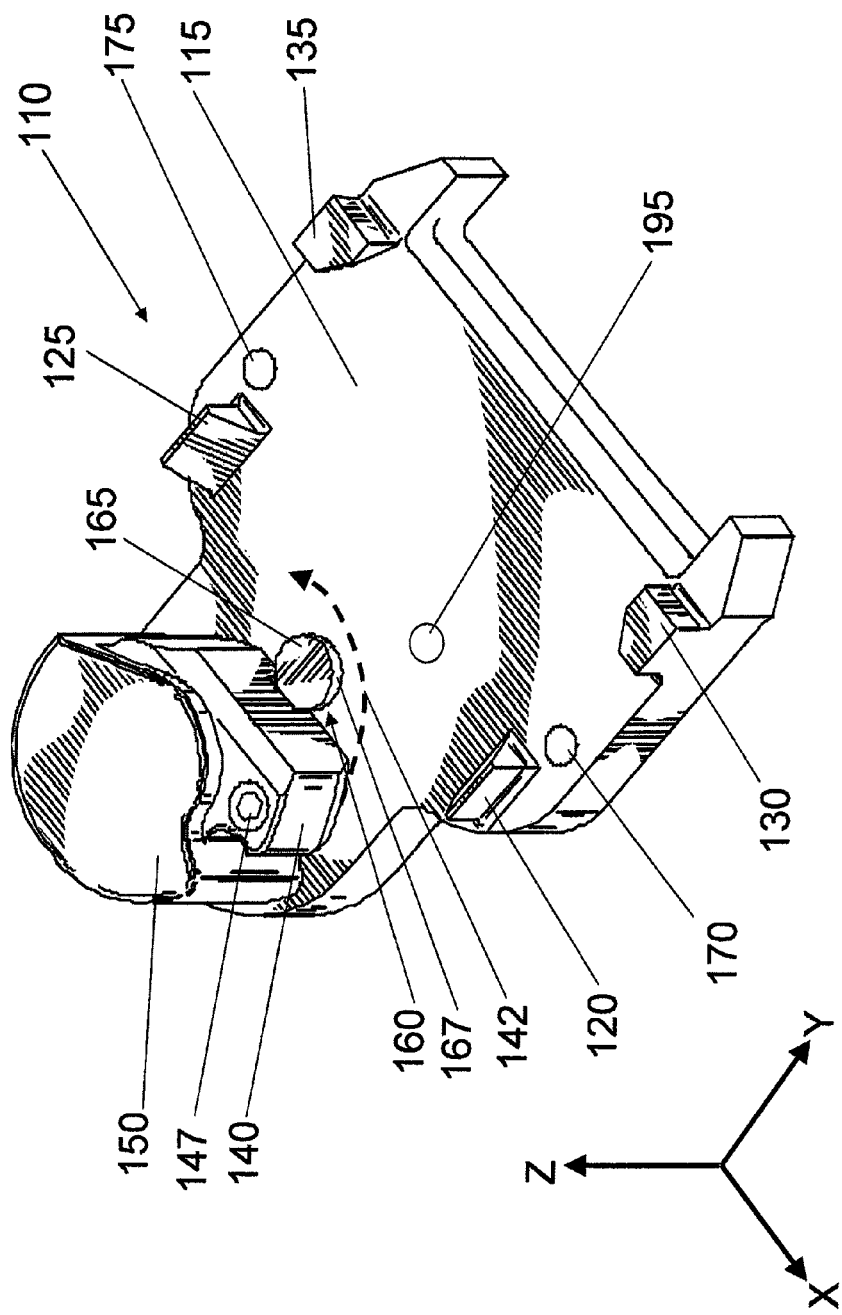
FIG. 2A is a base plate of a retaining system according to an example embodiment of the present invention.

The base plate 110, as depicted in FIG. 2A, may be constructed of a variety of available materials including metals, rigid plastics, or composites. The materials used may depend on the materials appropriate for the desired applications. The alignment guides 120, 125, 130, 135 may be formed as part of the base plate 110 (e.g., through molding or machining) or they may be affixed to the base plate 110. For applications in which the retaining system may experience significant forces and/or where the device secured within the retaining system is of substantial weight (e.g., greater than 8 ounces), it may be desirable to form the alignment guides 120, 125, 130, 135 as part of the base plate 110. Additionally, the size of the alignment guides 120, 125, 130, 135 may be selected based upon the application, including the potential forces involved and the size and weight of the device to be secured within the retaining system. Depending upon the application and installation location, the alignment guides 120, 125, 130, 135 of the base plate 110 may experience significant loads, such as side-loads (i.e., in the same plane as the mounting surface 115 of base plate 110), such that alignment guide 120, 125, 130, 135 size, design, and material may be an important design considerations.

As described herein a coordinate axis is defined by way of example as shown in FIG. 2A. The plane of the mounting surface 115 of the base plate 110 may define the X-Y plane with the Z-axis being perpendicular to the mounting surface 115. The X-axis may be parallel to a line between alignment guides 130, 135 while the Y-axis may be perpendicular to both the X-axis and the Z-axis.

The base plate 110 may further be configured with a cam 140 that is rotatable around the Z-axis substantially perpendicular to the mounting surface 115 of the base plate 110. The cam may be made of any suitable material including plastics, composites, or metals, but is preferably a rigid material that is not easily deformed. The cam 140 may be rotatable between a locked (closed) position and an unlocked (open) position. The support shoe 200 may be inserted into (or removed from) the alignment guides while the cam 140 is in the unlocked position, and insertion (or removal) is precluded when the cam 140 is in the locked position. The cam 140 may define a swept path 142 on the mounting surface 115 of the base plate 110 through which the cam 140 rotates as the cam 140 is advanced from the unlocked position to the locked position. The cam 140 may be biased towards the locked position by a variety of biasing mechanisms including a clock spring, a coil spring, a resilient member, etc. A housing 150 may at least partially surround the cam 140, may support the cam 140, and may house and support the biasing mechanism. The housing 150 may be formed together with the base plate through molding or machining, or the housing 150 may be constructed separately and attached to the base plate 110. The cam 140 may further include a keyway 147 configured to receive a key or a tool to advance the cam 140 from the locked position to the unlocked position as will be described further below.

The base plate 110 may be further configured with a pin 160 that includes a top surface 165 and a side surface 167. The pin 160 may define an engaged position and a disengaged position. When in the engaged position, the pin 160 may be raised and protrude from the mounting surface 115 of the base plate 110. When in the disengaged position, the top surface 165 of the pin 160 may be substantially co-planar or flat with respect to the mounting surface 115 of the base plate 110. Alternatively, in the disengaged position, the top surface 165 may be recessed below the mounting surface 115. The pin 160 may be biased in the engaged position with a biasing means, such as the compression spring 466 depicted in FIG. 2B. While the illustrated embodiment depicts a circular-shaped pin 160, other shapes may operate equally as well including square pins, hexagonal pins, or other shapes including irregular shapes.

The pin 160 may be at least partially within the swept path 142 of the cam 140 such that when the cam 140 is in the unlocked position, the pin 160 may be in the raised, engaged position and the cam 140 is biased against the side surface 167 of the pin 160. When the cam 140 is engaged with the side surface 167 of the pin 160, the cam 140 is held back and retained in the unlocked position. The transition between the top surface 165 of the pin 160 and the side surface 167 may include a radius or chamfer to aid engagement and disengagement with the cam 140. The cam 140 may include a recess or cavity into which the pin 160 may be disposed when in the engaged position. When the cam 140 is in the unlocked position, the pin 160 may be configured to be received within a recess of the cam 140 such that the cam 140 engages the top surface 165 of the cam 140 and retains the pin 160 in the raised, engaged position.

The base plate 110 may also include an activating feature 195 arranged to alert a device attached thereto that the device is installed into the base plate 110. The device, such as 180 of FIG. 1, may include a feature that activates, or turns on the device in response to contact or close proximity to the activating feature 195, such as a magnet disposed in the base plate 110. The activating feature 195 may cause the device to change operational states from a first mode, when not in proximity to the activating feature 195, to a second mode when in proximity to the activating feature 195. For example, a data recorder could be switched from a standby mode to an active mode when installed into a base plate and a magnet activating feature is detected.

Figure 2B:
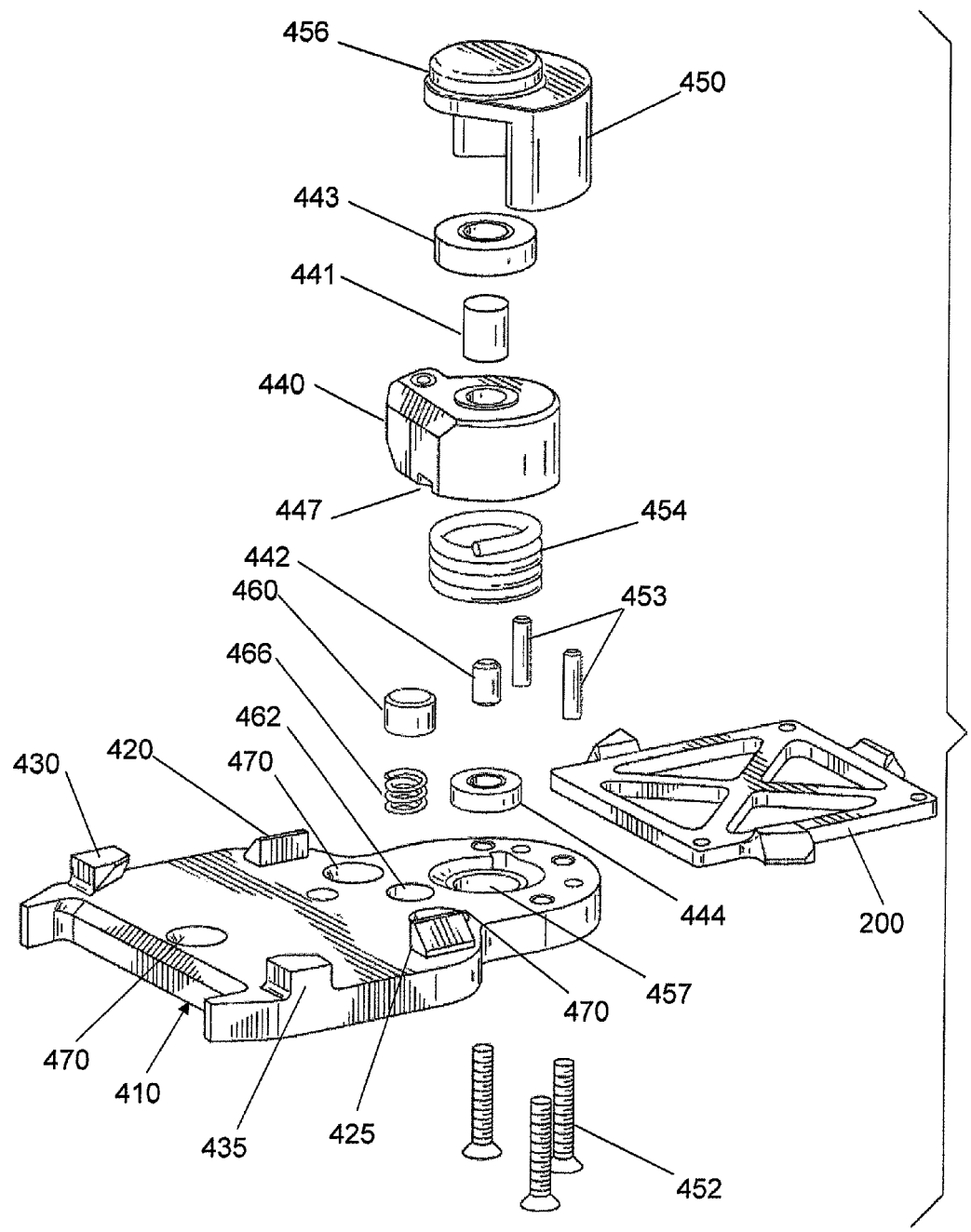
FIG. 2B is an exploded view of a base plate of a retaining system according to another example embodiment of the present invention.

FIG. 2B depicts an exploded view of another example embodiment of the present invention. The embodiment of FIG. 2B includes a base plate 410 as in the above example and further includes alignment guides 420, 425, 430, 435. The base plate 410 includes mounting holes 470, which, in the illustrated embodiment, include a countersink configured to receive the head of a fastener. The cam 440, configured to be received in the housing 450, may be axially supported by pins 441, 442 at both the top and bottom surfaces of the cam 440 respectively and the pins may be configured to engage bearings 443, 444. The bearings 443, 444 may be of any known type of sealed or unsealed bearings as may be appropriate or desirable for the application. The housing 450 may be configured with a recess 456 to receive the bearing 443 corresponding to the top surface of the cam 440 and the base plate 410 may include a recess 457 for accepting the bearing 444 corresponding to the bottom surface of the cam 440. Dowel pins 453 may align the housing 450 with the base plate 410 while fasteners 452 may be configured to attach and secure the housing 450 to the base plate 410. A rotational biasing element 454, such as the illustrated coil spring, may be configured to bias the cam 440 toward the locked position. In the depicted embodiment, the cam 440 may be configured with a cavity (not shown) to receive the biasing element 454. Pin 460 may be biased in the raised, engaged position from cavity 462 by another biasing element such as the compression spring 466 and the cam 440 may include a recess 447 configured to receive the pin 460 when the pin is in the raised and engaged position. The pin 460 may be further configured with a cavity (not shown) for receiving the compression spring 466.

Figure 3:
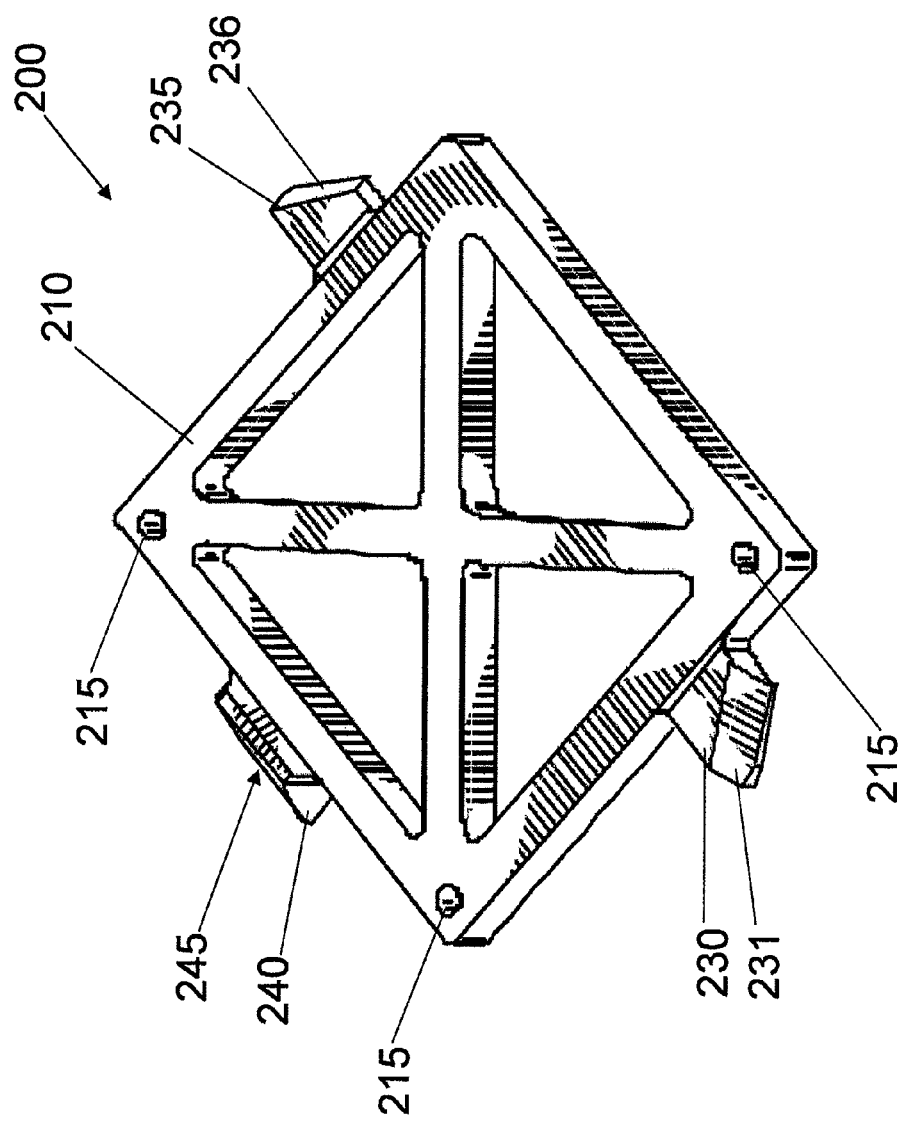
FIG. 3 is a support shoe of a retaining system according to an example embodiment of the present invention.

Retaining systems according to example embodiments of the present invention may further include a support shoe 200, as shown in FIG. 1 and further depicted in FIG. 3, configured for secure attachment to the base plate 110. The support shoe 200 may be constructed of a variety of materials but is preferably made of a rigid material of a strength commensurate with the base plate 110. The support shoe may be adapted to be attached to a variety of devices including data recorders or similar devices that may benefit from use with retaining systems of the present invention. The body 210 of the support shoe 200 may include mounting holes 215 adapted to receive fasteners for securing various devices thereto. The mounting holes 215 may be threaded for receiving threaded fasteners or they may be through holes or slots. Mounting holes 215 may be provided in multiple locations such that various devices with an assortment of bolt-patterns may be attached to a single configuration of support shoe 200. Additionally, while not illustrated herein, elements of the support shoe 200 that are configured for attachment to the base plate 110 may be included directly on a device that is to be secured in retaining systems according to embodiments of the present invention. Thus, a separate support shoe may not be required in such configurations.

The support shoe 200 may include alignment tabs 230, 235 configured with alignment engagement surfaces 231, 236 to engage alignment guides 130, 135 respectively. The alignment engagement surfaces 231, 236 may be integral with the body 210 of the support shoe 200 or protrude from the body 210 as alignment tabs 230, 235 as depicted in the illustrated embodiment. At least a portion of the back surface of the body 210 of the support shoe 200 may be configured to fit flush against the mounting surface 115 of the base plate 110 when the support shoe 200 is secured to the base plate 110. The support shoe may further include a locking tab 240 configured with a locking surface 245. While the depicted embodiment illustrates a locking tab 240 with locking surface 245, alternate locking surfaces, upon which the cam 140 may act, may be located on the body 210 of the support shoe 200 or located on the device 180 attached to the support shoe 200. The support shoe 200 or device 180 need to be securely retained by the cam 140, but the location of the locking surface may vary.

Figure 4:
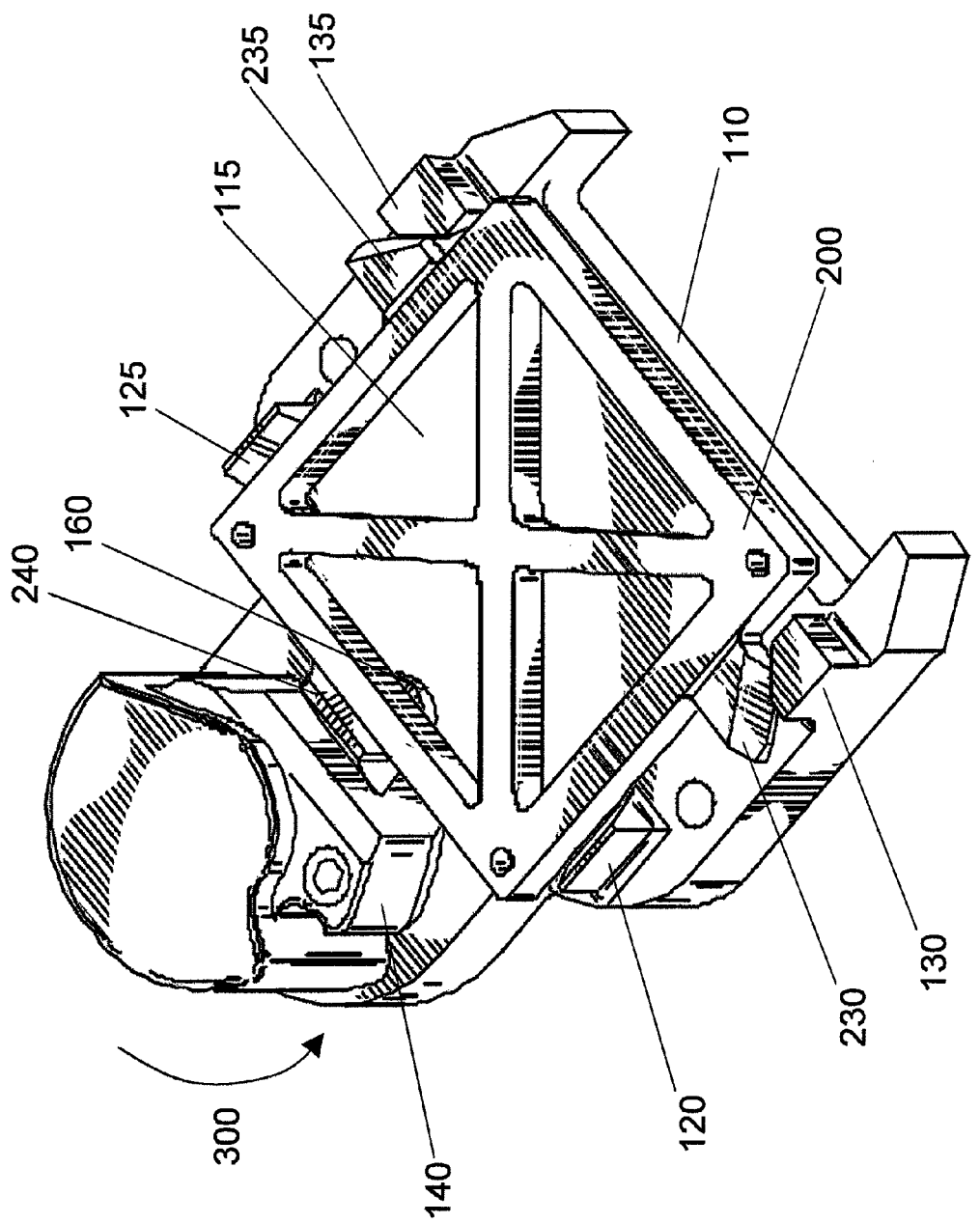
FIG. 4 illustrates a support shoe partially engaged with a base plate of a retaining system according to an example embodiment of the present invention.

FIG. 4 illustrates a support shoe 200 in partial engagement with a base plate 110 according to an example embodiment of the present invention. In practice, a device may be attached to the support shoe 200 prior to securing to the base plate 110; however, for ease of illustration and understanding, such a device has been omitted from the figure. The cam 140 is illustrated in the unlocked position as retained by the pin 160 as in FIG. 2A. The support shoe 200 may be placed on the mounting surface 115 into an area defined by the alignment guides 120, 125, 130, 135. The alignment tabs 230, 235 may be at least partially inserted into the alignment guides 130, 135 respectively. The alignment tabs 230, 235 and alignment guides 130, 135 are configured to bias the support shoe 200 towards the mounting surface 115 of the base plate 110 as the support shoe 200 is secured to the base plate 110 as described further below.

As the support shoe 200 of the illustrated embodiment is pressed onto the mounting surface 115 of the base plate 110 into the area defined by the alignment guides 120, 125, 130, 135, the support shoe 200 engages the top surface 165 of the pin 160. Further advancing the support shoe 200 into the base plate 110, including application of a force on the top surface 165 of the pin 160 causes the support shoe 200 to depress the pin 160, urging the top surface 165 of the pin 160 towards the mounting surface 115 of the base plate. When the top surface 165 of the pin 160 is depressed to a point where the pin 160 is no longer in engagement with the cam 140, the biasing element within the cam 140 may urge the cam 140 to sweep along path 142 in the rotational direction of arrow 300, towards the locked position. As further illustrated in FIG. 5, the cam 140 may act on the locking tab 240 to further urge the support shoe 200 into engagement with the alignment guides 120, 125, 130, 135 along the direction of arrow 310.

Figure 5:
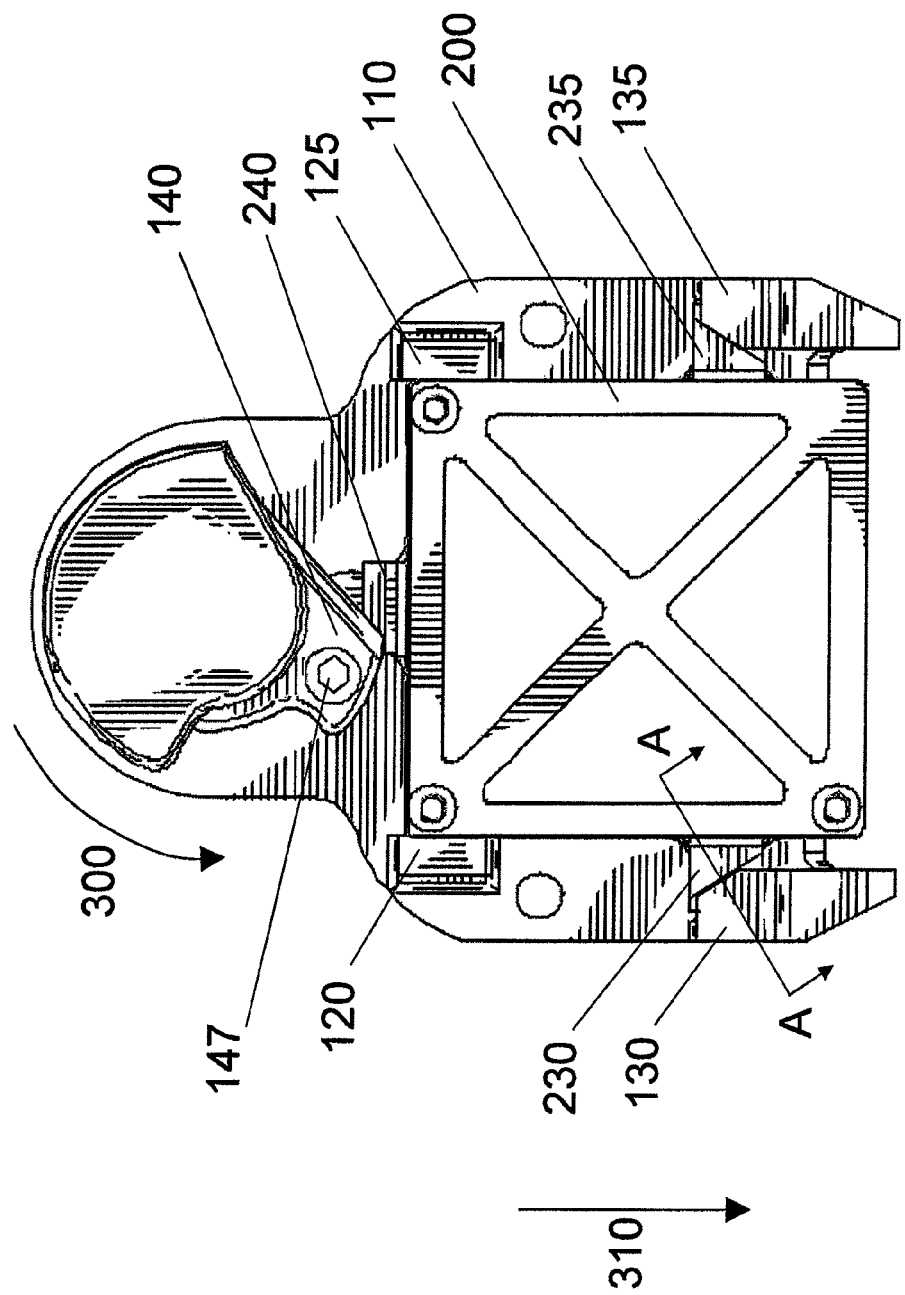
FIG. 5 illustrates a support shoe fully engaged with a base plate of a retaining system according to an example embodiment of the present invention.
Figure 6:
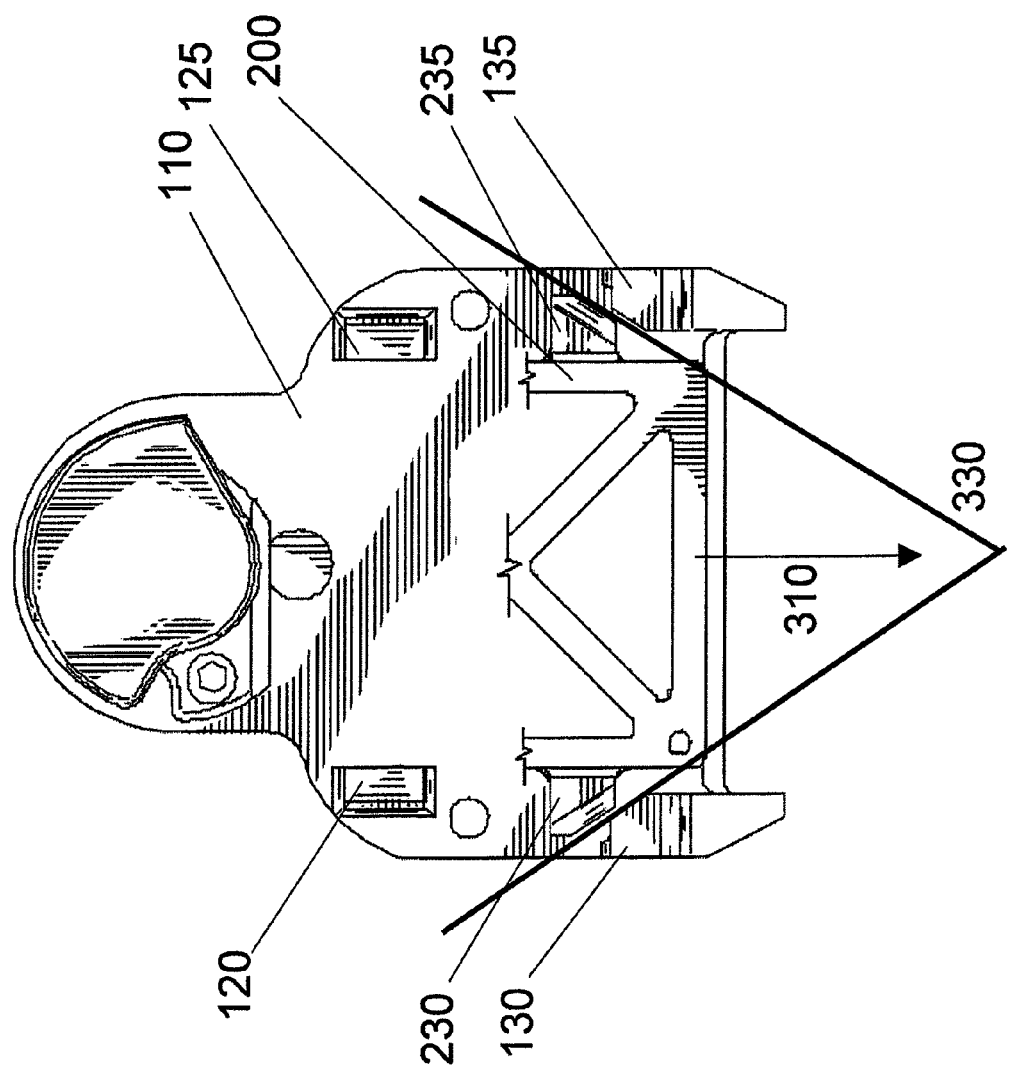
FIG. 6 illustrates part of a support shoe engaging a base plate of a retaining system according to an example embodiment of the present invention.

FIG. 6 illustrates one aspect of the interface between the alignment tabs 230, 235 and the alignment guides 130, 135 according to an example embodiment of the present invention. As illustrated by the intersecting angled lines 330, the alignment guides 130, 135 and tabs 230, 235, are configured with corresponding angles in a V-pattern. Thus, as the support shoe 200 is advanced in the direction of arrow 310 by the cam 140 acting on the locking tab 240 of the support shoe 200 (as shown in FIG. 5), the alignment tabs 230, 235 are driven into engagement with the alignment guides 130, 135 and the support shoe is aligned laterally (perpendicular to the direction of arrow 310) within the area defined by the alignment guides 120, 125, 130, 135. This secures the support shoe 200 in alignment with the base plate 110 in the X-axis direction as defined above. While alignment tabs 230, 235 are illustrated as two separate elements, a single alignment tab may include multiple alignment surfaces such as those of alignment tabs 230, 235, and provide for alignment of a single corresponding alignment tab arranged on the support shoe 200. Further, alignment tabs 120 and 125 may be arranged as a single unit. Alignment tabs 120, 125 may each be configured as a single piece with alignment tabs 130, 135 respectively.

Alignment tabs 120 and 125 may also aid in the alignment of the support shoe 200 to the base plate 110. With respect to FIGS. 4-6, alignment tabs 120, 125 are illustrated as angled elements that position the support shoe 200 therebetween and provide an additional means for aligning the support shoe 200 with the base plate 110 in the X-axis. Alignment tabs 120, 125 may have a beveled surface on the sides facing one another as illustrated in FIG. 2A, or the alignment tabs 120, 125 may include flat surfaces facing one another as illustrated in FIG. 2B, each configuration providing an alignment channel into which a support shoe 200 may be inserted.

Figure 7:
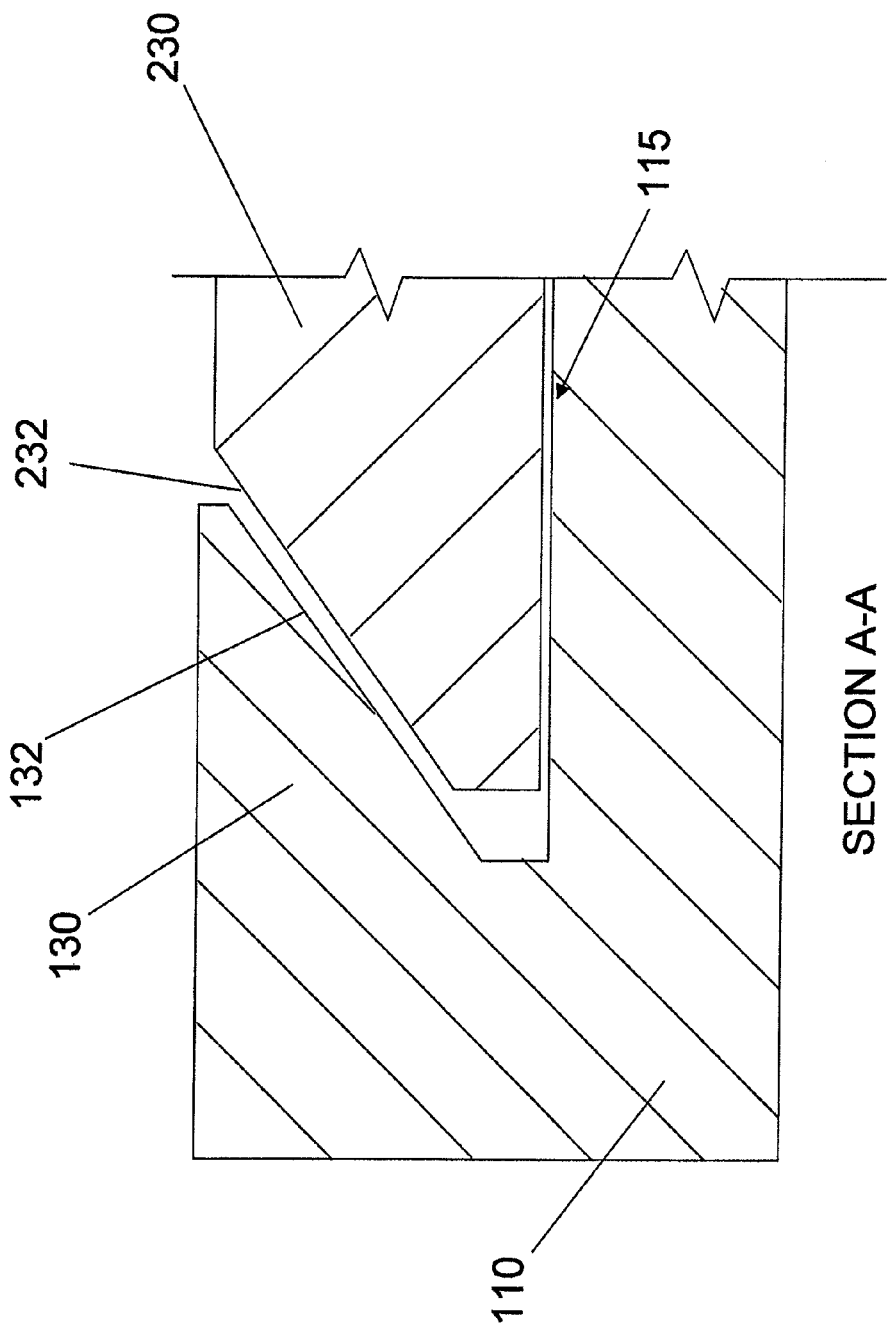
FIG. 7 illustrates a section view of an alignment tab of a support shoe engaging an alignment guide of a base plate according to an example embodiment of the present invention.

A further aspect of the interface between the alignment tabs 230, 235 and the alignment guides 130, 135 according to an example embodiment of the present invention is illustrated in FIG. 7, which depicts a cross-section view taken along section line A-A of FIG. 5 illustrating the interface of an alignment guide 130 and an alignment tab 230. The alignment tab surface 232 may include a chamfer on the surface opposite the mounting surface 115 of the base plate 110. The alignment guide 130 may include a chamfered surface 132 that is complementary to the chamfered surface 232 of the alignment tab. As the alignment tab 230 is advanced into engagement with the alignment guide 130 as described above, the chamfered surfaces 132, 232 co-act to urge the support shoe 200 (not shown) toward the mounting surface 115 of the base plate 110. This aligns and secures the support shoe 200 to the mounting surface of the base plate 110 in the Z-axis direction as defined above. The angles of the alignment guides 230, 235 cooperate such that the angles (as shown by lines 330 of FIG. 6) align the support shoe 200 in the X-axis while the chamfered surfaces (as shown by 132 of FIG. 7) align the support shoe in the Z-axis.

Figure 8:
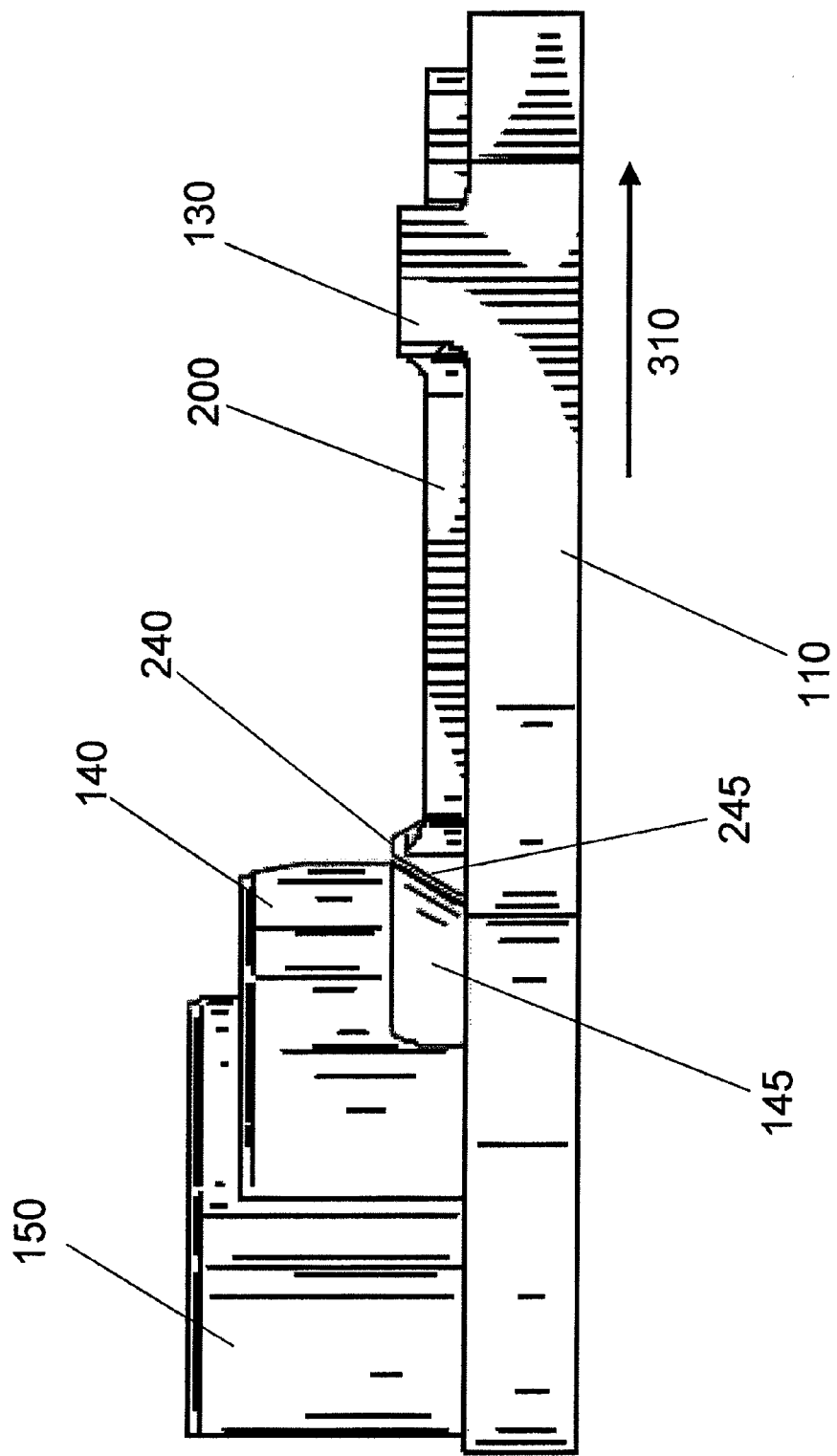
FIG. 8 illustrates a side view of a support shoe engaged with a base plate of a retaining system according to an example embodiment of the present invention.

The locking tab 240 of the support shoe 200 may include a locking surface 245 as illustrated in the example embodiment of FIG. 8, in which alignment guides 120, 125 have been omitted for clarity and ease of understanding. The locking surface 245 may be a chamfered edge similar to the chamfered surface 232 of the alignment tab 230. The locking surface 245 of the locking tab 240 may be configured to be engaged by a complementary curved chamfered cam surface 145 of the cam 140 as the cam 140 rotates from an unlocked position to a locked position. FIG. 8 illustrates the depicted embodiment with the cam in the locked position such that the cam surface 145 is engaged with the locking surface 245. The complementary curved chamfer of the cam surface 145 may drive the support shoe 200 in the direction of arrow 310 as the cam 140 advances from the unlocked position to the locked position. The complementary angles of the cam surface 145 and the locking surface 245 cooperate to urge the support shoe 200 both in the direction of arrow 310, into engagement with the alignment guide 130 and towards the mounting surface 115 of the base plate 110. This aligns and secures the support shoe 200 to the base plate 110 in the Y-axis direction and the Z-axis direction. The chamfered surfaces 232 of the alignment tabs 230, 235 and the chamfered surfaces 132 of the alignment guides 130, 135 in combination with the cam surface 145 and the locking surface 245 all work together under the bias of the cam 140 to secure and align the support shoe 200 flush to the mounting surface 115 of the base plate 110.

Referring back to FIG. 1, a device, such as a data recorder 180 may be attached to a support shoe 200 through various known attachment means. The illustrated embodiment depicts screws securing the device 180 to the support shoe 200. The base plate 110 may be secured to a structure, such as a structural element of a vehicle by various attachment means, such as screws through attachment holes 170, 175. The support shoe 200, with the device 180 mounted thereto, may be inserted into the area defined by the alignment guides 120, 125, 130, 135 of the base plate 110, as indicated by the installation lines 400. The alignment tabs 230, 235 are placed into at least partial engagement with the alignment guides 130, 135 and the support shoe 200 is placed between alignment guides 120, 125. As the support shoe 200 is received onto the mounting surface 115 of the base plate 110, a user securing the support shoe 200 to the base plate 110 presses the support shoe 200 towards the mounting surface 115. As the support shoe 200 is pressed into the mounting surface 115, the support shoe 200 depresses the pin 160 towards the mounting surface 115. When the pin 160 is depressed to the point where it is disengaged from the cam 140, the biasing element within the cam 140 or within the cam housing 150 drives the cam 140 from the unlocked position towards the locked position. As the cam 140 advances towards the locked position, and as illustrated in FIG. 8, the cam surface 145 engages the locking surface 245 of the locking tab 240 and drives the support shoe 200 in the direction of arrow 310. As the support shoe 200 is driven in the direction of arrow 310, the alignment tabs 230, 235 are driven into engagement with alignment guides 130, 135. When the alignment tabs 230, 235 are seated (i.e., having achieved maximum engagement) within the alignment guides 130, 135, the support shoe 200, and the device secured thereto 180, are secured to the base plate 110 in all three directions, X, Y, and Z.

Figure 9:
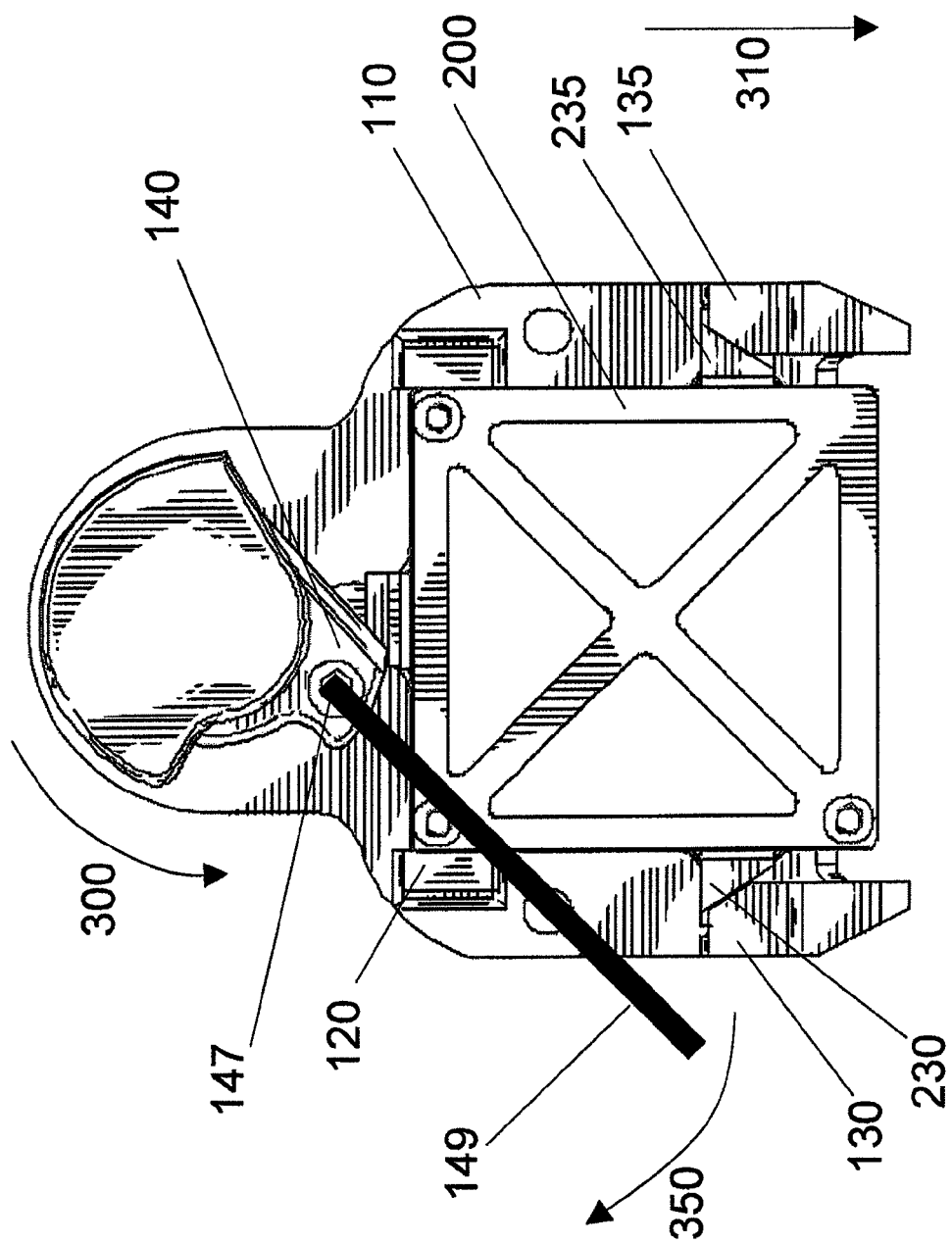
FIG. 9 illustrates a key inserted into a keyway of a retaining system according to an example embodiment of the present invention.

A mechanism may be provided by which a user removing the support shoe 200 from the base plate 110 may rotate the cam 140 from the locked position towards the unlocked position. In the illustrated embodiment of FIG. 9, a keyway 147 is depicted which allows a user to insert a key 149, such as a hex-key or allen-head key, and rotate the cam 140 clockwise towards the unlocked position by rotating the key 149 in the direction of arrow 350. The pin 160, as illustrated in FIGS. 1, 2, and 4, may be biased toward the engaged, raised position. When the key 149 is rotated in the direction of 350, causing the cam 140 to rotate toward the unlocked position (opposite arrow 300), the bias of the pin 160 causes the support shoe 200 to be at least partially disengaged from the base plate 110, separating the support shoe 200 from the mounting surface 115, and the pin 160 becomes engaged with the cam 140, retaining the cam 140 in the unlocked position. Thereafter, the key 149 can be removed from the keyway 147, and the support shoe 200 (and device 180 attached thereto) can be removed from the base plate 110. The cam 140 of the base plate 110 may remain in the unlocked position with the pin 160 engaged until a support shoe 200 is inserted to be secured to the base plate 110. In an alternative embodiment, the key 149 may be permanently affixed to the cam 140 or the cam 140 may include a mechanism by which a user may rotate the cam 140 manually from the locked position to the unlocked position. The cam 140 may include a lever-arm that facilitates rotation of the cam 140 against the bias. Such a configuration may further enable faster removal of the support shoe 200 from the base plate 110.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A retaining system comprising:
    a base plate comprising a cam, a pin, and one or more alignment guides, wherein the cam defines a locked position and an unlocked position, wherein the cam is biased toward the locked position, and wherein the cam is configured to be retained in the unlocked position by the pin when the pin is in a raised position, engaged with the cam; and
    a support shoe comprising one or more alignment surfaces and a locking surface wherein the support shoe is configured to be inserted into the alignment guides when the cam member is in the unlocked position;
    wherein in response to insertion of the support shoe into the alignment guides, the support shoe is configured to disengage the pin from the cam, and in response to the cam advancing from the unlocked position to the locked position, the cam is configured to engage the locking surface of the support shoe and bias at least one of the alignment surfaces into engagement with at least one of the alignment guides.

2. The retaining system of claim 1, wherein the pin is biased in the raised position.

3. A retaining system comprising:
    a base plate comprising a cam, a pin, and one or more alignment guides, wherein the cam defines a locked position and an unlocked position, wherein the cam is biased toward the locked position, and wherein the cam is configured to be retained in the unlocked position by the pin when the pin is in a raised position, engaged with the cam; and
    a support shoe comprising one or more alignment surfaces and a locking surface wherein the support shoe is configured to be inserted into the alignment guides when the cam member is in the unlocked position;
    wherein in response insertion of the support shoe into the alignment guides, the cam is configured to engage the locking surface of the support shoe and bias at least one of the alignment surfaces into engagement with at least one of the alignment guides as the cam is advanced from the unlocked position to the locked position,
    wherein the pin is biased in the raised position, and
    wherein the pin is configured to urge the support shoe away from the base plate in response to the cam being moved from the locked position to the unlocked position.

4. The retaining system of claim 1, wherein the support shoe is configured to be attached to a data recording device.

5. The retaining system of claim 1, wherein the base plate is configured to be attached to a structural member of a vehicle.

6. The retaining system of claim 1, wherein the location of the support shoe is fixed relative to the base plate when at least one of the alignment surfaces is engaged with at least one of the alignment guides and the cam is in the locked position.

7. The retaining system of claim 1, further comprising a housing attached to the base plate that at least partially encloses the cam member.

8. The retaining system of claim 1, wherein the cam comprises a keyway configured to receive a key for moving the cam from the locked position to the unlocked position.

9. A retaining system comprising:
    a base plate comprising:
        a plate;
        one or more alignment guides;
        a cam rotatable between a locked position and an unlocked position, wherein the cam is biased in the locked position; and
        a pin defining an engaged position and a disengaged position, and wherein when the cam is in the unlocked position the pin engages the cam and retains the cam in the unlocked position; and
    a support shoe configured to interface with the base plate, the support shoe comprising:
        a body including a front surface and a back surface, wherein the front surface is configured to receive a device;
        one or more alignment tabs, each alignment tab comprising an alignment tab engagement surface wherein each of the alignment tab engagement surfaces is configured at an acute angle relative to the back surface and is configured to engage one or more of the alignment guides of the base plate; and
        a locking surface configured at an acute angle relative to the back surface, wherein the one or more alignment tabs are driven into one or more alignment guides in response to the cam pressing against the locking surface.

10. The base plate of claim 9, wherein the pin is biased in the engaged position.

11. The base plate of claim 9, wherein the cam rotates to the locked position in response to the pin being moved to the disengaged position.

12. The base plate of claim 9, wherein the base plate is configured for semi-permanent attachment to a structure.

13. The base plate of claim 9, wherein the cam comprises a keyway configured to enable rotation of the cam from the locked position to the unlocked position when engaged by a key.

14. The base plate of claim 9, wherein the alignment guides each include an engagement surface and wherein at least two of the alignment guides include engagement surfaces that are arranged as a V relative to one another.

15. The support shoe of claim 9, wherein the locking surface is located on a locking tab that extends parallel to the plane of the back surface.

16. The retaining system of claim 9, wherein the cam is configured to engage the locking surface in response to the cam being rotated to the locked position.

17. The retaining system of claim 3, wherein the support shoe is configured to be attached to a data recording device.

18. The retaining system of claim 3, wherein the base plate is configured to be attached to a structural member of a vehicle.

19. The retaining system of claim 3, wherein the location of the support shoe is fixed relative to the base plate when at least one of the alignment surfaces is engaged with at least one of the alignment guides and the cam is in the locked position.

20. The retaining system of claim 3, wherein the cam comprises a keyway configured to receive a key for moving the cam from the locked position to the unlocked position.

* * * * *